United States Patent
Gitschel

(10) Patent No.: US 9,884,324 B2
(45) Date of Patent: Feb. 6, 2018

(54) ADVANCED SOLID WASTE SORTING SYSTEMS AND METHODS

(71) Applicant: Organic Energy Corporation, Sugar Land, TX (US)

(72) Inventor: George Gitschel, Sugar Land, TX (US)

(73) Assignee: ORGANIC ENERGY CORPORATION, Bellaire, TX (US)

( * ) Notice: Subject to any disclaimer, the term of this patent is extended or adjusted under 35 U.S.C. 154(b) by 371 days.

(21) Appl. No.: 14/587,846

(22) Filed: Dec. 31, 2014

(65) Prior Publication Data

US 2015/0108042 A1    Apr. 23, 2015

Related U.S. Application Data

(63) Continuation of application No. 14/231,291, filed on Mar. 31, 2014, now Pat. No. 9,649,666, which is a
(Continued)

(51) Int. Cl.
| | |
|---|---|
| B02C 23/00 | (2006.01) |
| B02C 23/08 | (2006.01) |
| B03C 1/18 | (2006.01) |
| B03C 1/247 | (2006.01) |
| B03C 1/30 | (2006.01) |
| B07B 4/02 | (2006.01) |
| B07B 9/00 | (2006.01) |
| B07B 11/04 | (2006.01) |
| B07B 11/06 | (2006.01) |

(Continued)

(52) U.S. Cl.
CPC ............ *B02C 23/08* (2013.01); *B02C 23/14* (2013.01); *B03B 9/06* (2013.01); *B03C 1/18* (2013.01); *B03C 1/247* (2013.01); *B03C 1/30* (2013.01); *B07B 4/02* (2013.01); *B07B 9/00* (2013.01); *B07B 11/04* (2013.01); *B07B 11/06* (2013.01); *B07B 15/00* (2013.01); *B03C 2201/18* (2013.01); *Y02E 50/343* (2013.01)

(58) Field of Classification Search
None
See application file for complete search history.

(56) References Cited

U.S. PATENT DOCUMENTS

| | | |
|---|---|---|
| 3,524,594 A | 8/1970 | Anderson |
| 4,063,903 A | 12/1977 | Beningson et al. |
(Continued)

FOREIGN PATENT DOCUMENTS

| | | |
|---|---|---|
| JP | 2003/001298 | 1/2003 |
| KR | 10-1999-0003753 | 1/1999 |
(Continued)

OTHER PUBLICATIONS

Nihot Recycling Technology B.V., "Nihot Drum Separator" 2 pages, (date unknown), Amsterdam, The Netherlands, http://www.nihot.co.uk/fileadmin/nihot/pdf/Nihot_Single_Drum_Separator_01_2011_ENG.pdf, website accessed on Sep. 9, 2013.

*Primary Examiner* — Faye Francis
(74) *Attorney, Agent, or Firm* — Workman Nydegger

(57) ABSTRACT

The method and systems efficiently extract recyclable materials from a mixed solid waste stream. The methods and systems use sizing, density and dimensional separation to produce intermediate waste streams that are enriched in particular recyclable materials. The recyclable materials can then be efficiently sorted from the individual intermediate streams using mechanized sorting equipment.

14 Claims, 6 Drawing Sheets

Related U.S. Application Data continuation of application No. 13/693,763, filed on Dec. 4, 2012, now Pat. No. 8,684,288, which is a continuation of application No. 13/221,647, filed on Aug. 30, 2011, now Pat. No. 8,322,639, and a continuation of application No. 13/221,637, filed on Aug. 30, 2011, now Pat. No. 8,398,006.

(60) Provisional application No. 61/417,216, filed on Nov. 24, 2010.

(51) Int. Cl.
*B02C 23/14* (2006.01)
*B07B 15/00* (2006.01)
*B03B 9/06* (2006.01)

(56) References Cited

U.S. PATENT DOCUMENTS

| | | | |
|---|---|---|---|
| 4,065,282 | A | 12/1977 | Morey |
| 4,264,352 | A | 4/1981 | Houser |
| 4,844,351 | A | 7/1989 | Holloway |
| 4,874,134 | A | 10/1989 | Wiens |
| 5,025,929 | A | 6/1991 | Carrera |
| 5,100,066 | A | 3/1992 | Frei |
| 5,184,780 | A | 2/1993 | Wiens |
| 5,361,909 | A | 11/1994 | Gemmer |
| 5,465,847 | A | 11/1995 | Gilmore |
| 5,649,785 | A | 7/1997 | Djerf et al. |
| 6,024,226 | A | 2/2000 | Olivier |
| 6,117,671 | A | 9/2000 | Yilmaz |
| 6,136,590 | A | 10/2000 | Kruse |
| 6,168,642 | B1 | 1/2001 | Valkanas et al. |
| 6,199,779 | B1 | 3/2001 | Mosher |
| 6,299,082 | B1 | 10/2001 | Smith |
| 6,379,527 | B1 | 4/2002 | Vogt et al. |
| 6,903,294 | B1 | 6/2005 | Daiku |
| 6,911,149 | B2 | 6/2005 | Hansen et al. |
| 7,290,669 | B1 | 11/2007 | Hansen et al. |
| 7,431,229 | B2 | 10/2008 | Gali |
| 7,452,467 | B2 | 11/2008 | Hansen et al. |
| 7,615,155 | B1 | 11/2009 | Hansen et al. |
| 7,767,924 | B2 | 8/2010 | Jeon |
| 7,810,646 | B2 | 10/2010 | Miller |
| 7,832,670 | B2 | 11/2010 | Peterson et al. |
| 7,942,273 | B2 | 5/2011 | Campbell |
| 8,307,987 | B2 | 11/2012 | Miller |
| 2002/0184816 | A1 | 12/2002 | Philipson |
| 2006/0001187 | A1 | 1/2006 | Allen, III et al. |
| 2006/0081513 | A1 | 4/2006 | Kenny |
| 2008/0020456 | A1 | 1/2008 | Choate et al. |
| 2008/0169231 | A1 | 7/2008 | Hansen et al. |
| 2008/0236042 | A1 | 10/2008 | Summerlin |
| 2009/0008298 | A1 | 1/2009 | Studley |
| 2009/0032442 | A1 | 2/2009 | Singh et al. |
| 2009/0152173 | A1 | 6/2009 | Miller et al. |
| 2010/0201026 | A1 | 8/2010 | Dvorak et al. |

FOREIGN PATENT DOCUMENTS

| | | |
|---|---|---|
| KR | 10-0665251 | 1/2004 |
| KR | 10/0517663 | 9/2005 |
| KR | 10-2006-059919 | 6/2006 |

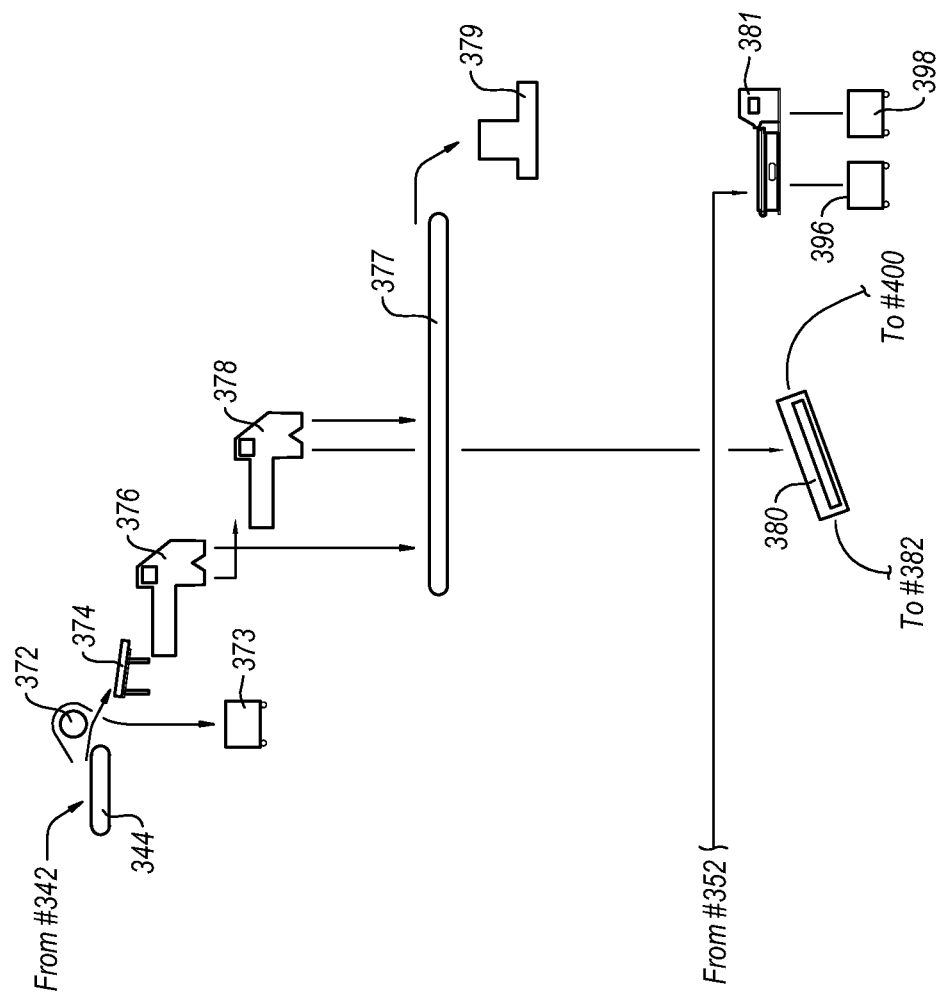

ADVANCED SOLID WASTE SORTING SYSTEMS AND METHODS

CROSS-REFERENCE TO RELATED APPLICATIONS

This application is a continuation of U.S. application Ser. No. 14/231,291, filed Mar. 31, 2014, which is a continuation of U.S. application Ser. No. 13/693,763, filed Dec. 4, 2012, now U.S. Pat. No. 8,684,288 which is a continuation of U.S. application Ser. No. 13/221,647 filed Aug. 30, 2011, titled "MECHANIZED SEPARATION OF MIXED SOLID WASTE AND RECOVERY OF RECYCLABLE PRODUCTS," now U.S. Pat. No. 8,322,639, which claims the benefit of U.S. Provisional application 61/417,216 filed Nov. 24, 2010, titled "MECHANIZED SEPARATION OF MIXED SOLID WASTE AND RECOVERY OF RECYCLABLE PRODUCTS." application Ser. No. 13/693,763 is also a continuation-in-part of U.S. application Ser. No. 13/221,637 filed Aug. 30, 2011 Titled "MECHANIZED SEPARATION OF MIXED SOLID WASTE AND RECOVERY OF RECYCLABLE PRODUCTS," now U.S. Pat. No. 8,398,006, which claims the benefit of U.S. Provisional Application 61/417,216 filed Nov. 24, 2010. All of the foregoing applications are hereby incorporated herein by reference in their entirety.

BACKGROUND OF THE INVENTION

1. The Field of the Invention

The present invention relates to systems and methods for recovering recyclable materials from solid waste streams such, but not limited to, municipal solid waste.

2. The Related Technology

Commercial, industrial, and residential consumers generate large amounts of throw-away and waste products (i.e., municipal solid waste) that need to be handled and disposed of in an environmentally satisfactory manner. Traditionally, municipal solid waste (hereinafter "MSW") has been disposed of by landfilling or incineration. However, these methods of waste product disposal contaminate the soil, water and air. Environmental restrictions as well as land usage demands for housing have reduced the number of sites available for landfills.

In response, governments and the public have demanded that, wherever possible, recycling systems should be employed to conserve material resources and to reduce pollution problems. Efforts have been made to recover valuable resources such as glass, plastic, paper, aluminum, and ferrous and non-ferrous metals from waste materials. For example, households in many cities are asked to sort their garbage into recyclables (e.g., paper, plastic containers, metal containers and glass containers) and non-recyclables. However, rates of non-compliance and mis-compliance are high. Some people fail to sort their waste at all and other sort it incorrectly, which either shunts recoverable materials into the waste stream or contaminates the recyclable stream with waste materials. Non-compliance and mis-compliance reduce the efficiency of and increases the costs associated with operating recycling systems designed to processed pre-sorted waste.

Some recycling systems attempt to avoid the problems with presorted waste by attempting to recover recyclable materials from mixed waste. However, many of these systems are fraught with the tendency to be highly labor intensive to operate, while offering relatively low recovery rates of recyclables. The energy balance of many recycling systems is sub-par or, in some cases, negative. Some recycling systems are so inefficient that the processes of recovering, transporting, and recycling the recyclable materials consumes more energy than could be saved by simply landfilling the garbage and making new products from raw materials. In other cases, so little of the recyclable materials are recovered that the problems with waste stream disposal go essentially unmitigated.

SUMMARY

The present disclosure relates to methods and systems for mining high value recyclable materials from a mixed solid waste stream. The method and systems can use sizing and density separation to produce intermediate waste streams that can be properly sorted to extract large percentages of valuable recyclable materials. The sizing and density separation produce intermediate streams that are enriched in particular recyclable materials. The recyclable materials can then be efficiently sorted from the individual intermediate streams using mechanized sorting equipment.

In addition to sizing and density separation, the flow of waste material may be metered throughout all or a portion of the system to ensure an acceptable flow rate and/or burden depth in the equipment. Proper mass flow and burden depth facilitates efficient extraction of the recyclable materials in the mechanical sorting equipment.

The systems and methods described herein can handle large volumes of highly variable mixed waste materials. The systems and methods can efficiently extract recyclables from unsorted mixed waste (e.g., black bin MSW), home-sorted recyclable streams where mis-compliance is high (e.g., blue bin MSW), and other types of MSW such as variable commercial solid waste streams from retail establishments, light manufacturing, warehouses, office buildings, etc., and industrial waste streams. The methods and systems described herein can recover significantly larger percentages of different types of recyclable materials from variable waste streams as compared to known systems. This ability is due in large part to the sizing, size separation, density separation, and dimensional separation, which creates a concentrated, homogenous intermediate waste streams from which recyclables can be mechanically extracted. Unlike traditional refuse derived fuel plants, the methods and systems of the invention fractionate and spread the waste material sufficiently to prepare the intermediate streams for efficient sorting in mechanical sorters such as optical sorters and eddy current sorters, and dimensional sorters such as ballistic separators and angled disc screens.

The need to efficiently extract multiple types of recyclable materials from variable mixed waste streams is a long-felt but unmet need. The inability of the industry to extract significant percentages of different types of recyclable materials from variable mixed waste streams has resulted in well-known political campaigns throughout much of the world to teach the lay population that it is their responsibility to hand sort recyclables at the time of generation and then disposal. Due to natural human behavior, these efforts, while laudable, have not resulted in desired recycle rates. The vast majority of recyclable waste materials continue to be poorly recovered and/or utilized. The methods and systems described herein meet this long felt and unmet need by efficiently recovering recyclables using mechanical devices that are arranged and configured to efficiently handle a varied solid waste stream. In addition, traditional curbside residential recycling programs and commercial recycling programs require expensive and polluting separate collection routes and vehicles. Furthermore, once collected by separate vehicles, the materials still need to be separated and the recyclables recovered in traditional Material Recovery Facilities (MRFs). This is highly inefficient and costly.

These and other features of the embodiments disclosed herein will become more fully apparent from the following description and appended claims.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

I. Methods for Mining Recyclables from Solid Waste Streams

Figure 1:
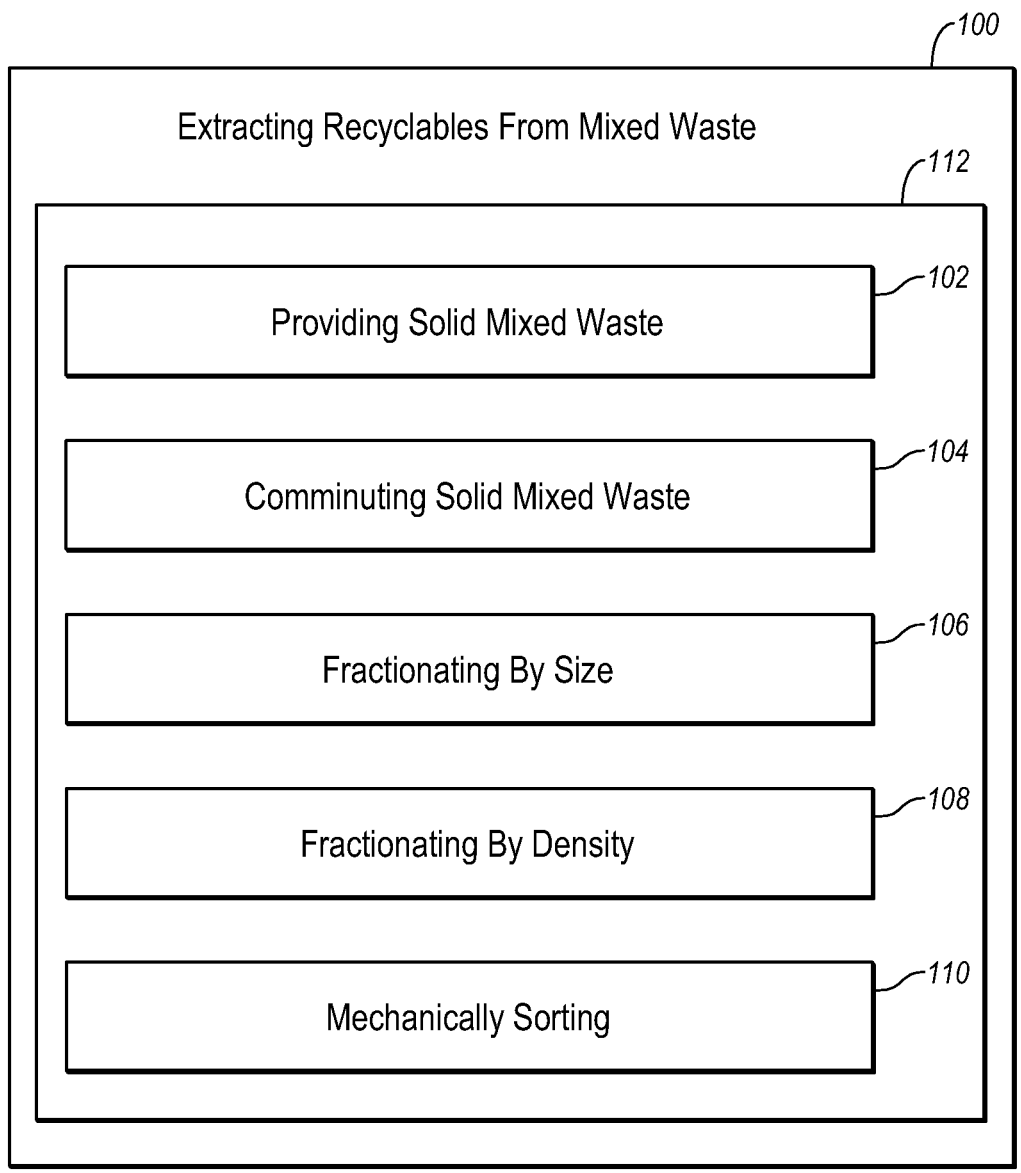
FIG. 1 is a flow diagram illustrating methods for recovering recyclable materials from a mixed solid waste stream.

FIG. 1 illustrates an example method 100 for recovering recyclable materials from a mixed solid waste stream. In one embodiment, method 100 includes (i) in a first step 102, providing a mixed waste stream including recyclable materials such as paper, plastic, and metal (particularly non-ferrous metal); (ii) in a second step 104, comminuting the mixed waste stream; (iii) in a third step 106 fractionating the mixed waste stream by size to produce a plurality of sized waste streams; (iv) in a fourth step 108, fractionating at least a portion of the sized waste streams by density to produce a plurality of intermediate waste streams individually enriched in one or more of the recyclable materials; (v) in a fifth step 110, individually sorting the plurality of intermediate waste streams using one or more sorting apparatuses to produce recyclable products such as, but not limited to recycled paper products, recycled plastic products, and/or recycled metal products. Optionally the method can include metering 112 and/or spreading the sized waste streams throughout any or all portions of process 100 to control mass flow and/or burden depth.

In the present disclosure, a number of comminuting and/or size fractionation steps are described with respect to methods and systems for the separation of solid waste. Typically each of these steps has an associated size cut-off. Persons having skill in the art will appreciate that fractionated materials typically exhibit a distribution of particles. The distribution will often include an insignificant number of particles above or below the cut-off. Unless otherwise specified, an upper cut-off number (e.g., 16" or less, 12" or less, 8" or less, the upper range of an 8" to 2" over fraction) generally means that about 90% of the particles in the fraction (i.e., the distribution) have a size of less than the cut-off number, while about 10% of the particles in the fraction will be larger than the upper cut-off size. Unless otherwise specified, a lower cut-off number (e.g., the lower range of an 8" to 2" over fraction) generally means that about 90% of the particles in the fraction have a size of larger than the cut-off number, while about 10% of the particles in the fraction are smaller than the lower cut-off size. In alternative embodiments, upper cut-off number can include 95% or 99% of the of the particles in the fraction and/or the bottom cut can include less than 5% or less than 1% of the particles in the fraction.

1. Providing Solid Waste Stream

The waste streams utilized in the methods and systems described herein include a mixture of different types of solid materials. The waste stream includes recyclable materials that upon separation from other types recyclable material or refuse can be utilized and therefore have value. In one embodiment, the mixed solid waste may be Municipal Solid Waste ("MSW") (i.e., trash or garbage). MSW is a type of waste material that includes predominantly household waste with sometimes the addition of commercial and/or industrial wastes collected by a municipality or a contractor hired by a municipality or by commercial and/or industrial businesses within a given area. Commercial solid waste is type of waste such as trash that is generally collected from businesses such as office buildings or business establishments. Industrial solid waste is generally found in heavy manufacturing industries. MSW and commercial waste generally does not include industrial hazardous waste. The mixed waste can be "black bin" waste in which little or no removal of recyclable material has been performed by the source of the waste or alternatively may be a recycled or "blue bin" waste that includes a mixture of recyclable waste materials (also referred to as "single stream waste"). The single stream waste may be commercial or residential and may have low or high mis-compliance.

Mixed waste contains a number of components that only have value as a recyclable material when separated from other components. These recyclable materials can include plastics; fiber materials, including paper and cardboard; metals, including ferrous metals and non-ferrous metals such as brass and aluminum; glass; textiles; rubber; and wood. Preferably the waste stream includes 1, 2, 3, or more high value materials including, but not limited to one or more of paper, plastic and non-ferrous material.

While even small percentages of these materials may be valuable, separating the recyclables from each other and other components in mixed solid waste streams is extremely challenging. This is especially true when two, three, four, or more different types of recyclables need to be separated and recovered. Mixed commercial and residential wastes may contain large amounts of non-recyclable waste materials such as food and kitchen waste; green waste, such as yard clippings, plants, vegetation, branches, and the like; and inorganic wastes, such as concrete, dirt, rocks, and debris.

The methods and systems describe herein include providing a mixed solid waste stream that includes at least one recyclable material, preferably at least two, and more preferably at least 3 different types of recyclable materials. In one embodiment, the waste stream includes at least two materials selected from the group of paper, plastic and metal. Preferably, the mixed waste stream includes paper, plastics, and metals.

The amount of recyclable materials in the stream, the percentage of the recyclable material recovered, and the value of the recycled material have a significant impact on the economic viability of extracting the recyclable materials through mechanized sorting (larger values being more desirable).

In one embodiment, the mixed waste stream may include at least 0.5%, 1%, 2%, 3%, 4%, 5% of a recyclable metal or less than 30%, 20%, 15%, 10%, or 5% (by weight) or a range of any of the forgoing upper and lower weight percents of recyclable metal material.

The mixed waste stream may include at least 2.5%, 5%, 7.5%, or 10% of a recyclable plastic material or less than 60%, 40%, 20% (by weight) or a range of any of the foregoing upper and lower weight percentages of recyclable plastic material.

The mixed waste stream may include at least 5%, 10%, 15%, 20%, 25%, or 30% of a recyclable mixed paper material or less than 80%, 70%, 60%, 50% or 40% (by weight) or a range of any of the foregoing upper and lower weight percentages of mixed paper material.

The mixed waste stream may include at least 15%, 25%, 35%, of a recyclable dry organic material and less than 80%, 70%, 60%, 50% or 40% (by weight) or a range of any of the foregoing upper and lower weight percentages of dry organic material. The mixed waste stream may include wet organic waste, dry organic waste, and/or inorganic waste. In one embodiment, the weight percentage of wet organic waste, dry organic waste, and inorganic waste in the mixed waste stream is each (independent of one another) at least 5%, at least 10%, at least 20%, at least 50%, or at least 75% (the sum of the three weight percentages not exceeding 100%).

In one embodiment, the mixed solid municipal waste may be an unprocessed municipal waste. For example, solid waste stream may be provided directly from a municipal garbage collection process. Alternatively, solid municipal waste may be partially pre-processed (e.g., by home owners) to remove a portion of the recyclable and/or recoverable materials. For example, solid municipal waste may be derived from a comprehensive residential or commercial waste stream that contains the remnant materials that exclude source separated materials collected through recycling programs in which a portion of certain recyclables (e.g., mixed paper, newspaper, cardboard, plastics, ferrous and non-ferrous metal and/or glass containers) have been removed (i.e., the MSW may be a post-recycled waste).

In either case (i.e. methods using unprocessed MSW or source separated MSW), the mixed waste may be manually pre-sorted to recover and remove items that are difficult to shred or grind, obviously hazardous, and/or that are particularly large (i.e., easily separated) and have a high recovery value. The presorting may be performed by loading waste into the system or may be carried out by personnel on a dedicated presorting line. For example, waste may be metered onto a presorting conveyor where manual labor identifies items to be pre-sorted. Typically presorted items will include items that could damage or cause excessive wear to the shredder or grinder. Examples include automobile engine blocks, structural steel, tire rims, propane tanks, concrete blocks, large rocks, and the like. Hazardous waste is preferably removed before grinding to avoid contamination with other materials in the mixed waste. Examples of obviously hazardous waste include containers of solvents and chemicals, paint cans, batteries, and the like.

Presorting can also be used to recover particularly large and valuable items that are easily picked from the mixed waste stream. Typically the recyclables recovered in the pre-sorting will be items that are several times larger than the burden depth of the process stream such that they are easily visible and efficiently removed manually. For example large cardboard boxes (e.g., corrugated containers), structural metal pieces, and electronic waste (e.g. eWaste) can be recovered in presorting. The percentage of materials in the mixed waste stream described above refer to percentage of the waste stream immediately before it undergoes comminution and/or sizing (i.e., after presort).

As mentioned, the methods described herein allow for recyclable materials to be mechanically sorted from municipal solid waste even when the waste includes large percentages of non-recyclable materials. In one embodiment the solid waste stream includes at least 20%, 25%, 35%, 50%, or 75% of one or more low value materials. The low value materials are materials that make separation of the high value materials difficult and that by themselves are generally not economical to separate. In one embodiment the low-value materials can be selected from the group consisting of, wet organics, green waste, food waste, grit, fines less than 1 inch, asphalt, concrete, textiles, and wood, rubber, film plastic, PVC, foil, rock, used consumer products, low value glass (glass too distant from a recycler), composite materials (e.g., tennis shoes), other materials typically found in solid waste, and combinations of these. The methods described herein overcome the long felt but unmet need to economically recover (i.e., mechanically sort) all or a portion of the valuable recyclables in these hard-to-handle waste streams. The individual low value materials can be in the solid waste stream in a concentration of at least 5%, 10%, 15%, 20%, or more.

Those skilled in the art will recognize that the composition of solid waste streams varies substantially over short periods of time. Of all the variability found in MSW, there are three constant characteristics in varying degrees or percentages; density, dimension (2-D or 3-D) and moisture content. This invention, in part, uses a variety of equipment that separates by size, density and dimension, and then directs material to equipment that separates or recovers by material type (e.g. resin type for plastic, ferrous metal, non-ferrous metals, glass, paper, etc.). For purposes of this invention, the percentage of a particular type of material within the waste stream can be calculated according to acceptable industry standards such as the 2011 Waste Disposal Guidelines published by the California Department of Resources Recycling and Recovery (Also known as "Cal-Recycle" and previously known as the California Integrated Waste Management Board), which is hereby incorporated by reference (available at www.calrecycle.ca.gov/wastechar/YourData.htm#Step1 and the links associated therewith). At a minimum sampling of a waste stream shall include analyzing samples of at least 200 lbs and sampling on a plurality of different days, weeks, and/or months.

2. Comminution

Optionally the mixed municipal solid waste is conveyed to a comminuting device such as grinder or shredder (step 104). Comminution (e.g., shredding or grinding) may be carried out to improve the efficiency of size separation and density separation. In one aspect, the conveyor in step 104 may include a metering system such as a metering wheel or other such material leveling or spreading device configured for controlling the flow and associated burden depth of MSW such that a relatively constant and evenly dissipated amount of material is spread across the full width of the conveyor, at a consistent burden depth or height, and fed to the grinder or shredder over time (and optionally a pre-sort conveyor).

Shredded or ground waste will have a range of particle sizes. In one embodiment the comminuted waste stream has a upper cut of 16 inches or less, 14 inches or less, 12 inches or less, 10 inches less, or 8 inches or less or a bottom cut greater than 1 inch 2 inch, 4 inch, or 6 inch, or may have a distribution with an upper cut and lower cut of any of the foregoing upper and lower cuts for the comminuted waste. In one embodiment, the ratio of the upper cut to lower cut may be less than 8, 6, or 4.

The size distribution of any particular fractured material generally depends on its material properties. For example, some objects like shipping pallets or tires will be ground or shredded to relatively large particle sizes. In contrast, brittle materials like glass, which tend to shatter, and food waste, which tends to easily shred, will be quite small after comminution.

The shredder or grinder used to comminute the mixed waste stream may include one or more shafts that include a number of cutting heads that that can cut and/or shred incoming waste materials to a selected size. Waste materials may be ground or shredded by turning rotors mounted with cutting blades or knives against a rigid blade housing, they then drop through the grinder or shredder to the screen basket (circular punch plate or finned design screens). Materials having a ground cut size less than a selected size, drop through a screen and move onto the next step in the process. Objects that are too large to pass through the screen are typically recirculated repeatedly through the grinder or shredder until they are ground to a size that can pass through the screen.

A number of solid waste grinders or shredders available in the marketplace are either adapted or can be adapted for comminuting the initial solid waste stream. For example, Vecoplan, LLC of High Point, N.C. makes a number of solid waste shredders that can be incorporated into the system and used in the methods described herein.

Preferably, the comminuted waste from comminuting device is ground or shred to a size of less than 18 inches, 16 inches, 12 inches, 10 inches, or 8 inches and greater than 2 inches, 4 inches, 6 inches, 8 inches, 10 inches, or a range from any of the forgoing upper and lower cutoff sizes. Comminuting the mixed MSW prior to size separation and density separation will increase the separation efficiencies of the density separators.

3. Size Separation

The comminuted waste may be conveyed to a size separator that fractionates the mixed waste by size (step 108) to produce two or more sized waste stream (e.g., at least an over fraction and an under fraction).

The sizing may be carried out to produce sized waste streams with a particular desired particle size distribution to facilitate density separation and to produce intermediate streams enriched in particular recyclable materials. Those skilled in the art will recognize that the comminuted waste stream can be analyzed to determine size cutoffs in which the fractions of the stream separate different types of materials into different streams while concentrating similar types of waste into somewhat concentrated streams. In addition, the sized waste streams may be optimized for density separation by creating sized waste stream with a narrow distribution of particles.

In one embodiment, the sized waste streams may have a size distribution with a ratio of small particles to large particles of less than about 10 (i.e., the ratio of the upper cut-off to the lower cut-off has a ratio less than about 10), more preferably, less than about 8, 6, or 4. An under fraction from size separation may have a top size cut-off of less than about 6 inches, 5, inches, 4 inches, 3 inches, or two inches and greater than 0.5 inch, 1 inch, 2 inch, or 3 inch, or a range within any of the foregoing upper and lower values for the top size cut. The upper fraction may have an upper size cutoff less than 16, inches, 12 inches, 10 inches, 8, inches or six inches and a lower size cutoff greater than 2 inches, 4 inches, 6, inches, or 8 inches or a range within any of the foregoing upper and lower cutoffs.

Suitable examples of a size separator that can be used in the present method include a disc screen separator with rubber or steel discs, a finger screen separator, a trommel screen separator, a vibratory screen separator, a waterfall screen, oscillating screen, flower disc screens, and/or other size separators known in the art.

A disc screen employs a series of rolling shafts having a series of attached discs with spaces between the discs that objects can fall through. The rolling of the shafts creates a wavelike action that agitates the incoming material as it is conveyed forward. This agitation releases smaller materials through the screen openings and is accomplished without vibration or blinding. The disc screen design greatly reduces the possibility of jamming or seizing during operation. Trommels, vibratory, or finger screens, waterfall screens, oscillating screens, flower disc screens, and/or other size separators known in the art also accomplish the same type of size separation objective, while using somewhat different engineered designs. Various size separators useful in the invention are commercially available through many different manufacturers worldwide. For example, disc screens, trommel screens, vibratory screens and waterfall screens are available from Vecoplan, LLC of High Point, N.C.

4. Density Separation to Produce Intermediate Streams

One or more of the sized waste streams are separated by density to produce intermediate waste streams that are individually enriched in one or more recyclable materials. Although not required, the density separation is preferably performed in a separate apparatus downstream from the size separator. Downstream density separation allows distinct density separators to be used on individual sized fractions, which allows the individual density separators to be configured for particular materials and streams. The density separator units may be calibrated to provide separation between particular materials in the mixed waste stream. Density separation can be used to separate different types of materials such as wet organics, dry organics, and inorganic materials, thereby enriching one or more particular intermediate streams in one or more different types of recyclable materials.

In mixed municipal waste streams, inorganic waste, wet organic waste, and dry organic waste often exhibit densities within particular ranges. For example, dry organics tend to have a density of greater than 1.0 lbs/cubic foot and less than about 12 or 15 lbs/cubic foot; wet organics tend to have a density greater than 8, 10, or 12 lbs/cubic foot and less than about 60, 80, or 100 lbs/cubic foot; inorganic materials tend to have a density greater than about 80 or 100 lbs/cubic foot. Thus, by setting the density separators accordingly, the wet organic, dry organic, and inorganic fractions may be separated based on density. Similarly, particular types of recyclable materials such as wood and textiles will often fall within a certain density range and can be selectively enriched in an intermediate waste stream. While the foregoing densities are useful for many municipal waste streams, those skilled in the art will recognize that the teachings provided herein can be used to analyze any waste mixed solid waste stream and determine density cutoffs that will generate intermediate waste streams enriched in recyclable materials.

In some embodiments, a series of density separators can be used to further fractionate the intermediate waste streams. In downstream density separators, the density cutoff is selected to fractionate either the lower or the upper fractions received from the upstream density separator. Additional size separation may also be carried out on density separated streams. Size and density separation are carried out until the intermediate stream is sufficiently enriched and homogenous in a particular recyclable material to allow efficient extraction of the recyclable material using mechanized sorting equipment.

Figure 2:
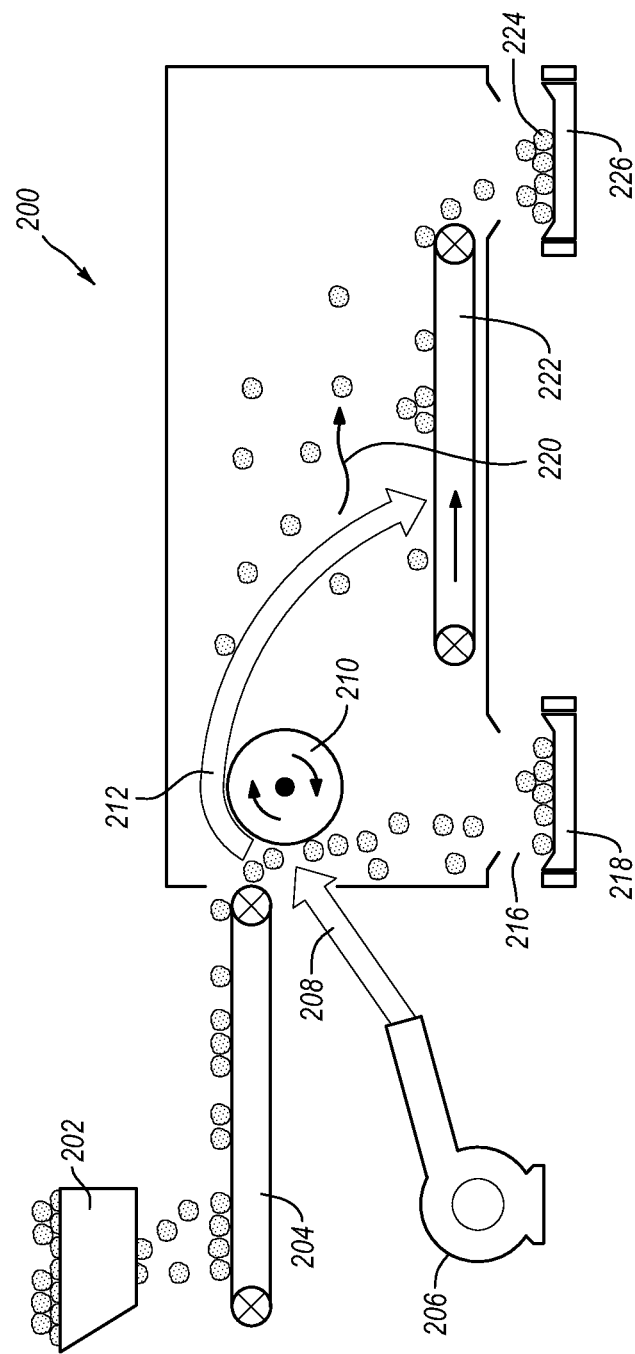
FIG. 2 illustrates a cut-away view of an air drum separator adapted for use in the system for separating solid waste, according to one embodiment of the present invention.

Referring now to FIG. 2, an example of a density separation unit that is adapted for separating municipal solid wastes by density is shown. FIG. 2 illustrates an air drum separator 200. The air drum separator 200 includes an input conveyor 204, a blower 206, a rotating drum 210, an output conveyor 222, a heavy fraction conveyor 218, and a light fraction conveyor 226. Mixed density wastes 202 are fed in on the input conveyor 204. As the waste material 202 is fed in, it drops off the end of the conveyor 202 where the wastes 202 encounter a stream of moving air 208 from the blower 206.

The heavy fraction 216 is separated from the mixed waste material 202 by virtue of being too heavy to be lifted by the airstream 208. The heavy fraction thus falls down in front of the drum 210 and falls on to the heavy fraction conveyor 218. In contrast, the lighter wastes are lifted up by the airstream 208 and carried over the rotating drum 210 and carried forward either by the airflow 220 or by the conveyor 222. The light fraction 224 drops off the end of conveyor 222 and onto the light fraction conveyor 226. These machines are highly adjustable to alter the weight density separation coefficient, as desired.

The relative density of the heavy fraction 216 and the light fractions 224 can be adjusted by controlling the airflow through the air drum separator 200. The velocity of the airflow and the volume of air passing through the drum separator 200 can be controlled either by increasing or decreasing the velocity of fan 206 or by opening or closing valve 212. In general, opening valve 212 and/or increasing the velocity of the fan 206 will carry heavier objects over the drum 210 such that the light fraction will have a higher average mass. Likewise, closing valve 212 or lowering the velocity of the fan 206 will cause the heavy fraction 216 to have a lower average mass and the light fraction 224 will have a lower average mass because only the lighter objects will be carried over the drum 210. Density separators suitable for use in the present invention include, but are not limited to air separators available from Westeria Fördertechnik GmbH, Ostbevern, Germany. While the particular example illustrated in FIG. 2 may be preferred in some embodiments, other separators can be used, including density separators that do not include drums (e.g., gravity/air separators, windshifters, windsifters, air knifes, etc.).

Density separators like those illustrated in FIG. 2 work best when the ratio between the largest and smallest objects being fed into the density separator is relatively narrow. Accordingly, it is preferable that the ratio of the largest to smallest objects that are fed into the density separators in the methods and systems described herein be about 12 to 1, about 10 to 1, about 8 to 1, 6 to 1, or about 4 to 1. Most preferably, the ratio of the largest to smallest objects that are fed into the density separators in the methods and systems described herein is about 6 to 1 (i.e., where the ratio of the top-cut to the bottom cut are in the foregoing ratios). In one embodiment, the methods and systems of the present invention are designed to provide waste materials to the density separators with particles size ratios within these approximate ranges.

5. Sorting Recyclable Materials from Intermediate Streams

The methods described herein also include extracting a plurality of recyclable materials from the intermediate waste stream using one or more mechanized sorting apparatuses. The particular mechanized sorting apparatus used depends on the particular recyclable material to be extracted.

In one embodiment, the intermediate waste stream may be enriched in metal, including a ferrous metal and/or a non-ferrous metal. To extract a non-ferrous metal an eddy current separator can be used. The eddy current separator can recover non-ferrous metals such as aluminum, brass and copper. Alternatively, or in addition, the metals may include ferrous metal and one or more magnetic separation devices can be positioned downstream of the density separator and configured to collect ferrous metal. Examples of magnetic separators include drum magnets, cross-belt magnets, head pulley magnets, and the like. Optical sorters, stainless steel sorters, infrared sorters, camera sorting machines, induction sorters, metal detection systems, X-ray sorters and the like can be used to separate different types of metals from one another, to produce a recyclable product. The recyclable metal products produced in the methods and systems described herein can be selected from the group including non-ferrous recyclable products such as aluminum, brass, and copper and/or other metals such as iron and/or stainless steel.

In one embodiment, the sorting apparatus may be a dimensional sorter such as a 2D-3D sorting apparatus. Examples of 2D-3D sorters include ballistic separators and/or screens configured to separate two-dimensional items from three-dimensional items. Two or more ballistic separators and/or screens can be used in series or parallel. The dimensional separators can be used to recover one or more materials that are comingled with another material having a similar density, but having substantially different dimensional properties (other than size). For example, in one embodiment, the 2D-3D separator may be used to separate rigid plastics (which tend to be three dimensional) from plastic film and/or paper, which are generally two-dimensional. Two dimensional plastics including films and rigid materials generally have a thickness less than ⅛ inch. Thus, the 2-dimensional materials are considered 2-dimensional because their thickness is much less than their length and width (e.g., 10 times or 100 times less). In addition or alternatively, a 2D-3D separator can be used to separate wood (which tends to be more three dimensional) from textiles (which tends to be more two dimensional).

Another mechanized sorting apparatus that can be used is an optical sorter. The optical sorter may be configured to separate film plastics from paper or separate different types of plastics from one another. For example an optical sorter can be configured to recover HDPE and/or PETE from an intermediate waste stream. One or more optical sorters may also be configured to recover #1-7 plastics and/or to remove and/or recover PVC plastics. The optical sorters may also be used to sort glass from an intermediate stream enriched in small inorganic particles. There are many types of optical sorter technologies, including, but not limited to; Near Infrared (NIR), camera color sorters, X-Ray, etc.

Optical sorters can scan the intermediate waste stream and determine whether the material being analyzed is a particular type of plastic, paper, or glass. The optical sorter upon detecting a particular material uses air directed through nozzles to eject the targeted/identified material to produce one or more recycled products such as recyclable PETE, recyclable HDPE, recyclable film plastic, recyclable #3-7 plastic and/or recyclable paper products.

Any optical sorter known in the art can be used. For example, in one embodiment the optical sorter can operate by scanning the intermediate waste stream in a free fall using a camera sensor. The camera sensor detects the material and then air jets may quickly eject the material while in free fall. There are also optical sorters that utilize near infrared, X-Ray and other scanning technologies to separate targeted materials from mixed streams. Any number of optical sorters can be used in series or parallel. Manufacturers of optical sorters include TiTech Pellenc, MSS, NRT and others.

The mechanical fractionating and sorting of the systems and methods described herein are particularly useful for extracting high value waste materials such as paper, plastic, and non-ferrous metals. In prior art systems these items have been particularly difficult (or practically impossible) to extract and/or sort from mixed solid waste. Conventional systems often cannot extract a significant portion of paper, plastics and/or non-ferrous metals because these materials cannot be extracted using a magnet. It is well-known to use magnets in traditional mixed waste processing systems. Magnets are sufficiently inexpensive and can be used in multiple locations within a system to make their use economically viable even when the magnet only extracts a small percentage of the ferrous material. However, recovering even ferrous metal from mixed solid waste is extremely difficult and inefficient due to the multitude and variety of materials found in mixed solid waste. The typical condition of mixed solid waste, as it is purged from the collection vehicles and/or transfer trailers, is such that a simple magnetic device would likely get a very small percentage, under 20%, of the available ferrous metal contained in the mixed solid waste stream and any metal recovered in such a fashion would be highly contaminated by other materials found in mixed solid waste that would be caught between the magnet's surface and the ferrous metal object that was attached (e.g. paper, plastic, etc.). In contrast, materials such as recyclable plastics, paper, and non-ferrous metals (e.g. brass) are often not extracted from mixed waste because the sorting equipment for these particular materials cannot handle the waste streams as configured in these systems. Despite the fact that non-ferrous metals and many sorted recyclable plastics typically have a value 5-15 times as much as ferrous metals, the industry usually only uses mechanical means to extract ferrous metal. Furthermore, recovery of these higher value recyclables such as paper, plastics and non-ferrous metals is plagued by the same usual conditions of mixed solid waste, in that such recyclables are so thoroughly mixed and hidden within the large variety of other non-recyclable items found the mixed waste stream (e.g. organics, inert materials, wood, textiles, fines, etc.). Additionally, a large portion of mixed solid waste, especially from residential collection routes and multi-family dwellings is deposited in plastic bags and discarded. Manually opening bags of trash that would somehow be picked from mixed solid waste and the subsequent sorting and recovery of any liberated recyclables, would be cost prohibitive in all but the most underdeveloped Countries. Finally, the highest valuable recyclable commodities/materials (e.g. PETE plastic, HDPE plastic, #3-7 plastic, aluminum cans, stainless steel, copper, brass, mixed non-ferrous metals) are generally found to be comprised of very small percentages of between 0.1% to 4%, on an individual material basis, relative to the overall mixed solid waste stream. Without most or all of the components described herein (e.g., preparation, metering, homogenizing and sorting), extracting these high value recyclable materials from materials with such low available percentages within the mixed waste stream is nearly impossible to do in an economically viable method.

6. Metering to Control Flow Rates and Burden Depth

Optionally, the methods can also include metering the sized waste streams and intermediate waste streams throughout the system to achieve a desired mass flow and burden depth. In one embodiment, the comminution apparatus, size separator, density separator, and/or mechanized sorters are separated by one or more conveyors that have variable speed controls. The variable speed control can be set to optimize the mass flow through the comminution apparatus, size separators, density separators, and/or mechanized sorters to optimize the quantity, purity, and/or value of the recyclable materials being recovered from the overall system by ensuring a metered and evenly distributed presentation of material to the individual devices. One or more sensors positioned upstream, downstream, or within the one or more of the components of the system can be used to monitor the separation efficiency, effectiveness, separation purity and/or rate of recovery of the recyclable materials. These values can then be used to optimize or maximize one or more parameters of the system such as recovery quantity, purity, and/or value of the recyclable materials recovered. Examples of sensors that can be used to control the flow rate of the waste streams include level sensors such as, but not limited to optical sensors and/or ultrasonic sensors that measure the height of material building up on a conveyor and/or upstream of a metering device and/or that measure open space on a belt. A belt, metering device, or other piece of equipment can be sped up or slowed down using the sensor data to ensure that a flow rate or desired burden depth is achieved on a belt or in or through a piece of processing equipment (e.g., size separators) and/or any other portion of the system described herein. Other sensors include mechanical switches that are physically actuated by the waste stream building up beyond a desired level (e.g., height), which actuates the mechanical switch to provide a signal that can then be used to regulate flow or burden depth. The speed of all metering equipment including; walking floors; conveyors; metering drums; shredders and grinders; air drum separators; screens of all types; vibratory feeders; metering feeder bins; load levelers; and other such devices can be controlled and adjusted via control systems and other devices in order to properly meter material through all portions of the invention. In some embodiments, the metering can be critical to obtain the desired high recovery and purity of recyclable materials from mixed solid waste.

The systems and methods can include using a plurality of sensors and metering the flow or depth burden of waste material conveyed to a plurality of sorting apparatuses. Although not required, it is preferable that each sorting apparatus have a sensor associated therewith and that the sensor be used to independently control metering of the two or more sorting apparatuses. For example, a level sensor or flow sensor can be positioned near an inlet of any combination of 3-dimensional sorter, optical sorter, eddy current separator, or the like.

7. Recovery Rates of Recyclable Materials

The present invention is particularly advantageous for recovering the majority of one or more different types of recyclable materials present in a mixed solid waste stream. The methods and systems are particularly useful where high value recyclables are present in very low concentrations. The systems and methods allow processing of mixed waste stream to metaphorically speaking "pick the needle out of the haystack." In one embodiment, the mixed waste stream may include at least one type of recoverable material at a concentration less than 15%, less than 10%, less than 5%, or even less than 1%, where the system or method is configured to recover at least 50%, at least 70%, at least 80%, or even at least 90% of the particular recoverable material.

In addition, the methods and systems as described herein may recover at least 25%, 50%, 75% or 90% of the recyclable metal in the waste stream (by weight) as recyclable metal product having a purity suitable for sale to a merchant of recyclable metals.

The process may recover at least 25%, 50%, 75% or 90% of the recyclable plastic materials in the mixed waste stream (by weight) to yield a recyclable plastic product having suitable purity for sale to a merchant of recyclable plastic products.

The process may recover at least 25%, 50%, 75% or 90% of the recyclable mixed paper products in the mixed waste stream (by weight) to yield a recyclable mixed paper product having a purity suitable for sale to a merchant of recyclable mixed paper.

The process may recover at least 25%, 50%, 75% or 90% of the recyclable dry organic materials to produce one or more (e.g., 1, 2, 3, 4, or more) recyclable dry organic products. The dry organic products may be selected from the group of mixed paper, 3-D plastics, film plastics, textiles, and wood.

The comminuting, size separation, and/or density separation may be used to produce homogeneous recycle streams that are sufficiently free from contamination to be recycled or used without further separation from other types of components present in the mixed waste and/or that are marketable as a recyclable product.

II. Systems for Separating Municipal Solid Waste

Figure 3:
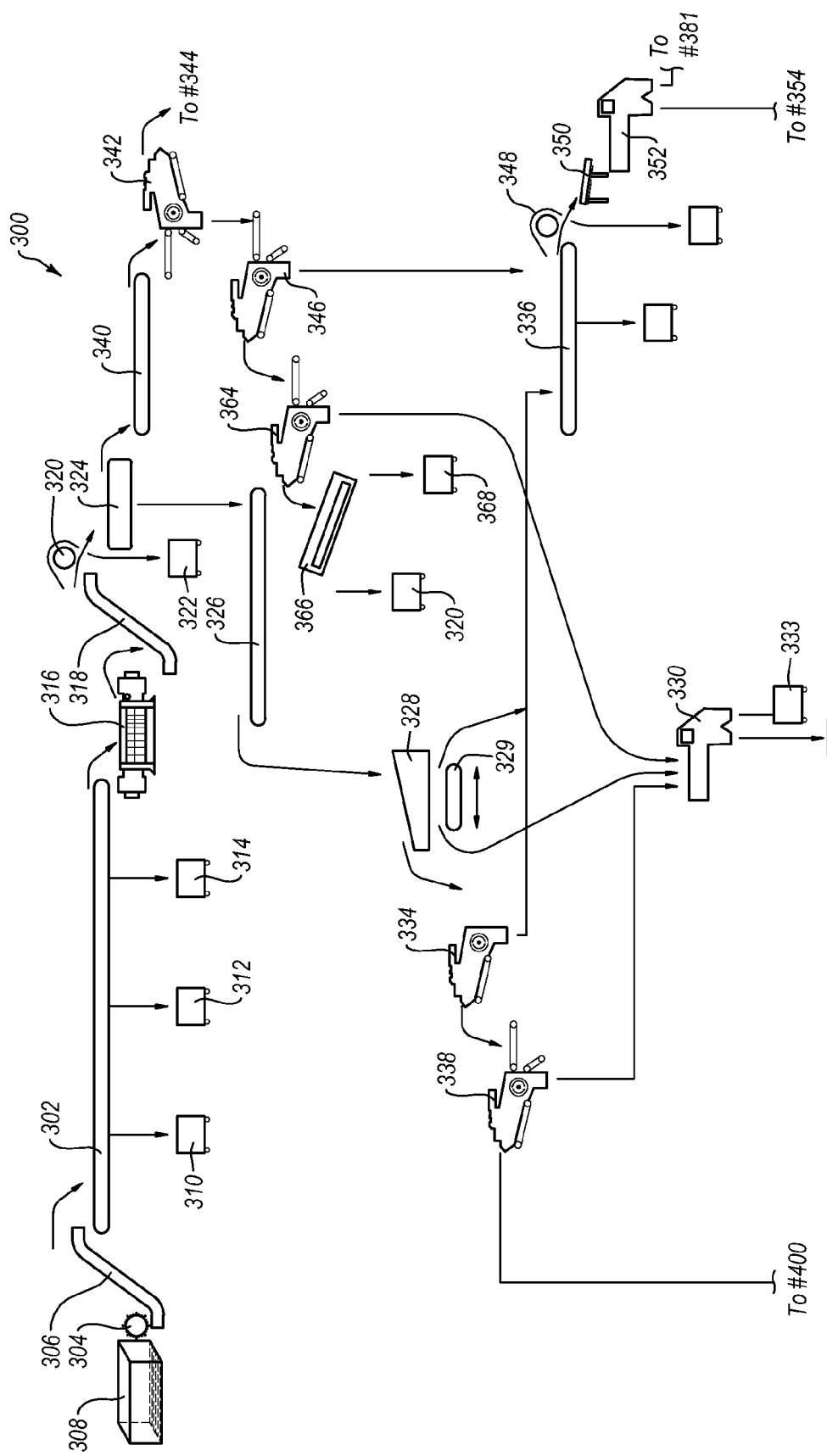
FIG. 3 is a flow diagram illustrating a system for separating solid waste, according to yet another embodiment of the present invention.
Figure 3:
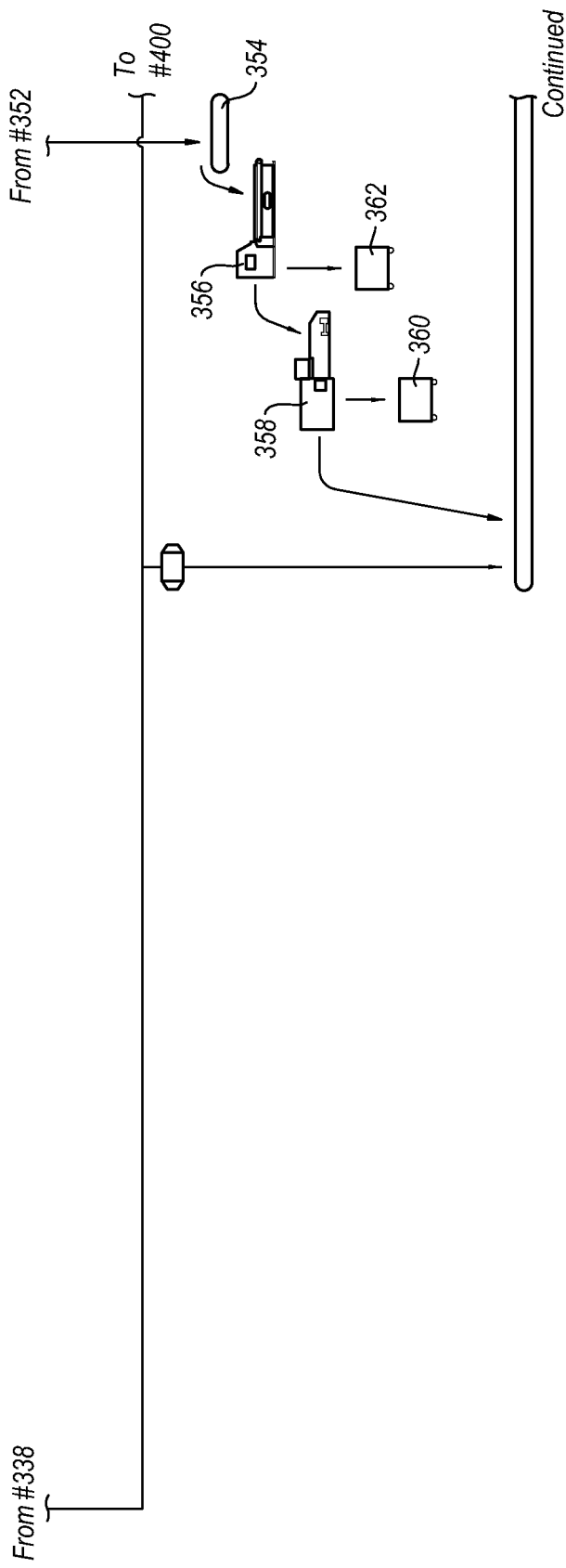
Figure 3:
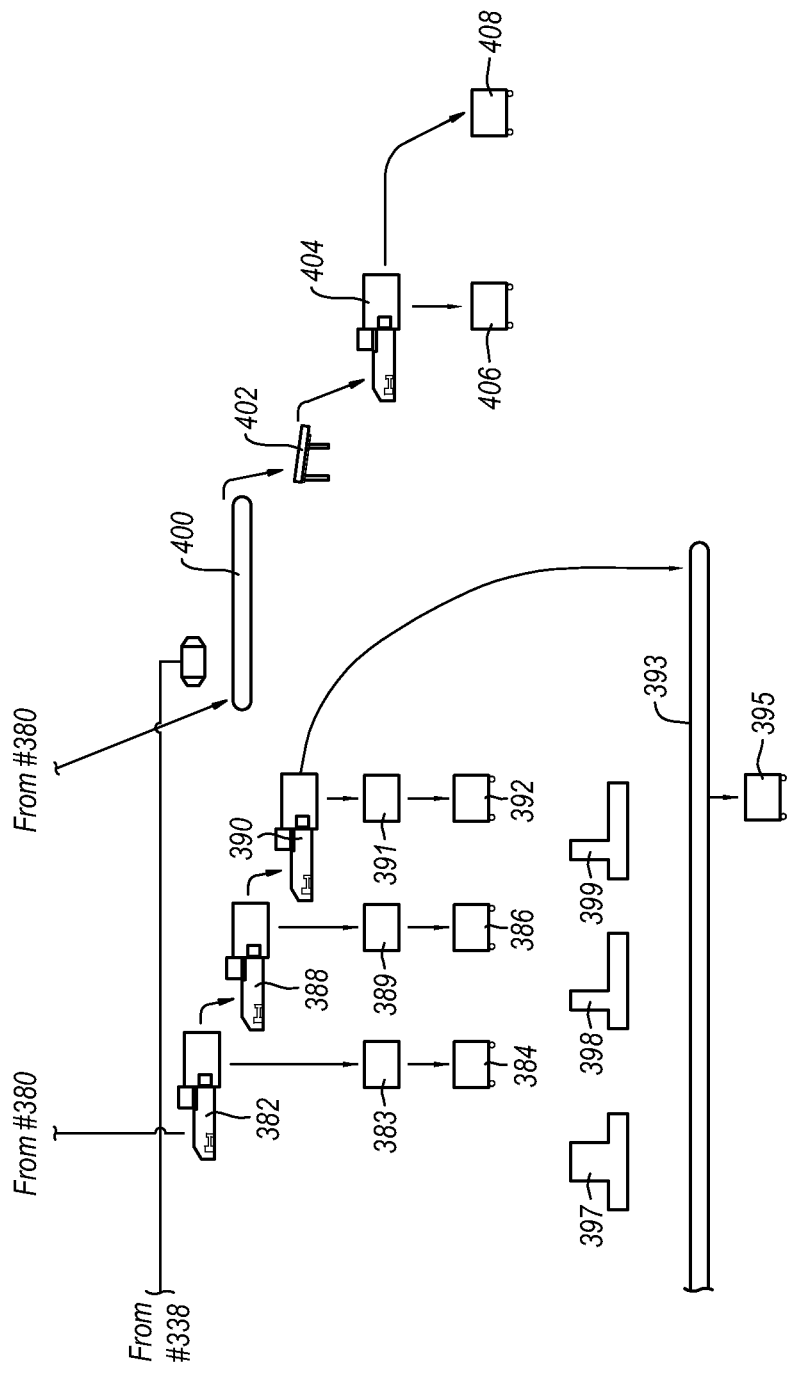

FIG. 3 illustrates a system 300 that can be used to extract recyclable materials from a mixed waste stream. In FIG. 3, a mixed solid waste, such as municipal solid waste, is metered to a presorting conveyor 302. Metering may be carried out using a metering drum 304 and an infeed conveyor 306 that receives the mixed solid waste from a walking floor bunker feeder 308. Mixed solid waste on conveyor 302 is transferred to shredder 316. Mixed waste on conveyor 302 may be sorted manually. For example, manual laborers may pick large pieces of cardboard that are easily identifiable and selected out of large volumes of waste. Other materials may also be manually picked prior to shredding, including large pieces of treated wood, electronic waste (e.g. eWaste) or other obviously valuable items that can be efficiently hand-picked or otherwise conveniently pulled from conveyor 302. Picked cardboard may be collected and stored in bin 310 or baled and shipped to a paper mill. Other recyclable materials such as non-ferrous and ferrous metals and/or other sources of recyclable materials may be collected and stored in bin 312 or additional bins. In addition, hazardous waste may be collected and stored in bin 314 and subsequently disposed of in a proper manner. While presorting is not required, pre-sorting can be particularly useful to avoid contamination from hazardous wastes and potential damage to the shredder from heavy ferrous structural metal, concrete, large stones and other items.

Material from conveyor 302 that is not picked is delivered to shredder or grinder 316 which shreds or grinds the waste to a desired top cut as described above. The shredded material is moved on a conveyor 318 under a suspended magnet 320, which collects ferrous metal exposed in the waste stream and delivers it to ferrous metal storage 322. Due to burden depth, the magnet 320 is preferably a suspended drum magnet although other magnets may be used alone or in combination with a suspended drum magnet. Drum magnets are advantageous due to the burden depth prior to size sorting and their ability to capture ferrous metal in flight after being discharged from the conveyor 318 therefore minimizing most non-metallic cross contamination of the extracted ferrous metal.

Comminuted waste passing under magnet 320 is delivered to screens 324, which separates the comminuted waste stream by size to produce a first over fraction and a first under fraction. Screens 324 may include one screen or a plurality of similar and/or different sized screens and types of screens to produce one or more under fractions and one or more over fractions. The over fraction may be enriched in dry organics and under fraction may be enriched in wet organics.

The under fraction (i.e., fines) from screens 324 is conveyed on conveyor 326 to a second screen 328. The under fraction (i.e., fines) from second screen 328 may include wet organics and/or heavy inorganic materials, which may be processed using an eddy current separator 330 to recover non-ferrous metals. Conveyor 329 may be switchable to direct the fines from screen 328 to conveyor 336 if the inorganic fraction is dominant or to eddy current separator 330 if the wet organic is dominant. The wet organics from eddy current separator 330 can be collected and stored in bin 332 and the non-ferrous metals collected in bin 333.

The over fraction (i.e., coarse) from fine screen 328 may be further processed in density separator 334 to produce a light fraction having a small particle size and a heavy inorganic fraction. The heavy inorganic fraction can be conveyed to conveyor 336 and the light fraction can optionally be loaded in a second density separator 338 for additional separation into a light dry organic fraction and a heavy wet organic fraction.

With reference now to the first over fraction (from screen 324), the over fraction is conveyed on conveyor 340 to third density separator 342. Third density separator 342 can be configured to produce a light intermediate stream and a heavy intermediate stream. For example, third density separator 342 may be configured to cut in a range from 8-15 lbs. The light intermediate stream (i.e., less than 8-15 lbs) may be enriched in dry plastics, paper, light ferrous metals (e.g. tin cans and tin can lids and other light ferrous metal items) and light non-ferrous metals (e.g., aluminum cans and other light non-ferrous items), which are transferred to conveyor 344.

The heavy intermediate waste stream from third density separator 342 (i.e., greater than 8-15 lbs) may be enriched in heavy inorganic and heavy wet organic materials, which are delivered to fourth density separator 346 for additional separation. Fourth density separator 346 may cut in a range from 60-120 lbs to produce a light intermediate stream, which is delivered to fifth density separator 364. Fourth density separator 346 may also produce a heavy intermediate stream (i.e., greater than 60-120 lbs) enriched in heavy inorganic waste, which is delivered to conveyor 336. The intermediate stream on conveyor 336 may be sorted using a suspended drum magnet to collect ferrous metal and the remainder of the stream loaded on a vibratory feeder 350 that feeds an eddy current separator 352, which separates non-ferrous metal from the residue of inorganic waste. The non-ferrous metals may be further separated in infrared or other sorter 381 to extract copper and/or brass from other non-ferrous metals (i.e., to produce a mixed non-ferrous product stored in bin 396 and a brass and/or copper product stored in bin 398). The non-ferrous metals may be baled and/or bulk stored for shipment to mills.

The remainder of the waste stream exiting eddy current separator 352 is loaded on conveyor 354 and further processed using stainless steel sorter 356 and glass optical sorter 358. The intermediate stream may be sorted to extract stainless steel using stainless steel sorter 356 and/or sorted to extract glass using optical sorter 358. The sorting can produce recyclable stainless steel product and recyclable glass products, which can be stored in bins 362 and 360, respectively.

With reference again to fifth density separator 364, the light intermediate stream from separator 346 can be fractionated at a density of up to 15 lbs for the wood and textiles to 40 lbs-60 lbs for the heavy wet organics to produce a light intermediate waste stream enriched in wood and textiles. The wood and textiles can be separated on 2D-3D sorter such as ballistic or angled disc screen separator 366 to yield-three dimensional recyclable wood product and a two-dimensional recyclable textile product, which can be collected in bins 368 and 320, respectively. The heavy stream from separator 364 may be enriched in heavy wet organics and can be delivered to eddy current separator 330 and/or joined with waste from separators 328 and 338.

With reference again to conveyor 344, the intermediate light stream from density separator 342 may be processed by suspension magnet 372 to yield a recyclable ferrous metal product collected in bin 373. The portion of intermediate stream that passes under magnet 372 and onto vibratory feeder 374 is loaded into a series of eddy current separators 376 and 378, which process the intermediate stream to recover non-ferrous metals. The non-ferrous metals may be collected on conveyor 377 and compacted into bales using baler 379 and then stored for shipment.

The dry organics not recovered in eddy current separators 376 and 378 provide an intermediate stream enriched in paper and plastics. The intermediate stream enriched in paper and plastics can be processed using a 2D-3D separator such as ballistic or angled disc screen separator 380. Ballistic or angled disc screen separator 380 separates plastic films and/or paper (i.e., 2D particles) from three-dimensional particles such as fractured rigid plastics. The 2D-3D separator can be placed before or after the eddy current separators 376 and 378.

The two-dimensional materials from ballistic or angled disc screen separator 380 can be delivered to conveyor 400 and the three-dimensional material can be further processed using optical sorters. The three-dimensional material can be processed in a first optical sorter 382 to produce an HDPE plastic product or PETE plastic product or #3-7 plastic product that is deposited onto quality control conveyor 383 and deposited into bin 384 or baled in baler 385. The intermediate stream can then be processed in a second optical sorter 388 to produce a PETE plastic product or HDPE plastic product or #3-7 plastic product that is deposited onto quality control conveyor 389 and deposited into bin 386 or baled in baler 387. Finally, the intermediate waste stream may be processed in a third optical sorter 390 to produce a recyclable #1-7 plastics product or HDPE plastic product or PETE plastic product that is deposited onto quality control conveyor 391 and deposited into bin 392 or baled in baler 397. The remainder of the waste stream from optical sorters 382, 388 and 390 may be a non-recyclable residual material or an improperly sorted recyclable material (e.g., PVC, stones, foam, fragment of an aluminum can, etc.), which may be collected on conveyor 393 and/or collected in bin 395 or transfer trailer prior to being disposed of in a landfill or further separated into potentially recyclable fractions of mixed inorganic material and transformed into various building materials that can potentially be marketed or used in construction applications. Quality control points can be placed between the optical sorters and bins as illustrated by quality control points 383, 389, and 391. The quality control points can be manual or mechanized inspection. In addition the materials in bins 384, 386, and 392 may be baled in balers 397, 398, and 399, respectively.

With reference now to the two-dimensional material received on conveyor 400 from ballistic or angled disc screen separator 380, the two-dimensional material may be an intermediate stream enriched in film plastic and mixed paper. The two-dimensional materials may be loaded into a dosing bin or other type of metered storage and feeding device 402 and then metered to a plurality (e.g., 2-12) optical sorters 404 that are configured to separate film plastics from paper. Optical sorters 404 produce a recyclable plastic film product 406 and a recyclable mixed paper product 408, either or both of which may be baled and/or stored for sale or shipment.

Wet organics produced in system 300 (e.g., wet organics in bin 332) can be further processed using one or more anaerobic digesters to produce a biogas that can be used as a fuel and/or a compost that can be used as a soil amendment or may be dried to make an organic fuel for combustion as a carbon fuel substitute. A description of suitable microbial digestion systems that can be used to digest the wet organic waste product produced in the current method can be found in U.S. Pat. No. 7,615,155 entitled "Methods for removal of non-digestible matter from an upflow anaerobic digester," U.S. Pat. No. 7,452,467 entitled "Induced sludge bed anaerobic reactor," U.S. Pat. No. 7,290,669 entitled "Upflow bioreactor having a septum and an auger and drive assembly," and U.S. Pat. No. 6,911,149 entitled "Induced sludge bed anaerobic reactor," and in U.S. Pat. Pub. No. 2008/0169231 entitled "Upflow bioreactor with septum and pressure release mechanism," the entireties of which are incorporated herein by reference.

Wet organics produced in system 300 (e.g., wet organics in bin 332) can be further processed, composted, provided to or sold to a processor as a highly concentrated mixed wet organics stream (e.g. food waste and yard waste and green waste).

The dry organic fuel products can, for example, be used alone or with another fuel in place of coal and other carbon based fuels in a number of industrial and energy generation processes. The dry organic fuel can also be used as a fuel to make synthesis gas through a variety of high temperature thermal conversion processes (e.g. gasification, plasma arc gasification and pyrolysis.) The dry organic material may also be stored on-site in either a bulk storage building with an automated filling and discharge system or storage silos with unloading devices.

Those skilled in the art will recognize that the recyclable products produced using the methods described herein are highly enriched in a particular type of recyclable material, which makes the one or more different products useful as a feed material in a recycling process. Nevertheless, the recyclable products are usually not 100% pure. While the recycling industry cannot use raw unprocessed refuse, most recycling systems can properly operate with small amounts of impurities. The systems and methods of the invention are used to produce recycled products having a suitable purity for use in the recycling industry.

While it may be desirable to recover value from essentially all the components of a solid waste stream, the present invention includes embodiments in which all or a portion of the wet organic fraction, dry organic fraction, or inorganic fraction is not fully separated into a recovered product. For example, in one embodiment all or a portion of the wet organic fraction, dry organic fraction, or inorganic fraction, whether mixed, properly separated, or improperly separated may simply be landfilled depending on the purity of the particular fraction and/or the market conditions for recycling the particular fraction (e.g., film may be landfilled).

While many of the methods and systems disclosed herein have been described as including density separation, those skilled in the art will recognize that in some embodiments, sufficient separation can be achieved without density separation, so long as the waste stream is comminuted and separated by size to produce intermediate streams enriched in at least one recoverable material.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for recovering recyclable materials from mixed solid waste stream, comprising:
   providing a mixed waste stream comprising at least one high value material selected from the group consisting of paper, plastic, and metal, wherein the mixed waste stream includes at least 20% by weight of low value material selected from the group consisting of wet organics, green waste, food waste, grit, fines less than 1 inch, asphalt, concrete, textiles, and wood, rubber, film plastic, PVC, foil, rock, used consumer products, low value glass, composite materials, and combinations of these;
   fractionating the mixed waste stream by size to produce one or more sized waste stream, each sized waste stream having an upper size cut and a lower size cut where the size ratio of an upper cut-off to a lower cut-off is less than 8; and
   fractionating the one or more sized waste streams by density in a plurality of density separators to produce at least three intermediate waste streams, each of the intermediate waste streams including a mixture of waste having different densities.

2. The method of claim 1, wherein the upper size cut and lower size cut for each sized waste stream is produced using first and second screens with different cut sizes.

3. The method of claim 1, further comprising sorting each of the three intermediate waste streams to produce a recovered product therefrom, wherein the recovered products are selected from paper, high-value plastic, metal, textiles, wood, rubber, film plastic, polyvinyl chloride, and foil.

4. The method of claim 1, wherein the recovered products include textiles, wood, rubber, or a combination thereof.

5. The method of claim 1, wherein the first intermediate stream includes dry organics and has a median density in a range from 1.0-12 lbs/ft$^3$.

6. The method of claim 5, wherein the second intermediate stream includes wet organics and has a median density greater than 12 lbs/ft$^3$ and less than 80 lbs/ft$^3$.

7. The method of claim 1, further comprising fractionating the one or more sized waste streams by density to produce a fourth intermediate waste stream including a mixture of waste having a density different than each of the three intermediate waste streams.

8. The method of claim 7, wherein the first intermediate waste stream has a median density less than 15 lbs/ft$^3$, the second intermediate waste stream has a median density in a range from 15-40 lbs/ft$^3$, the third intermediate waste stream has a median density between 40-60 lbs/ft$^3$ and the fourth intermediate waste stream has a median density of 60 lbs/ft$^3$ or greater.

9. The method of claim 8, further comprising sorting at least a portion of the intermediate waste streams to produce a plurality of recovered products selected from paper, plastic, metal, textiles, wood, rubber, and film plastic.

10. The method of claim 1, wherein the sorting includes separating 3-dimensional items from 2-dimensional items using a 2D-3D sorter.

11. The method of claim 1, wherein the sorting includes separating waste items using optical sorters.

12. The method of claim 1, wherein ratio of upper cutoff to lower cutoff is less than 6.

13. The method of claim 1, wherein ratio of upper cutoff to lower cutoff is less than 4.

14. A method for recovering recyclable materials from mixed solid waste stream, comprising:
   providing a mixed waste stream comprising at least 5 materials selected from the group consisting of paper, plastic, metal, wet organics, green waste, food waste, grit, fines less than 1 inch, asphalt, concrete, textiles, wood, rubber, film plastic, PVC, foil, rock, used consumer products, low value glass, and composite materials;
   fractionating the mixed waste stream by size to produce one or more sized waste stream, each sized waste stream having an upper size cut and a lower size cut where the size ratio of an upper cut-off to a lower cut-off is less than 6; and
   fractionating the one or more sized waste streams by density in a plurality of density separators to produce at least four intermediate waste streams, each of the intermediate waste streams including a mixture of waste having different densities, wherein the first intermediate waste stream has a median density less than 15 lbs/ft$^3$, the second intermediate waste stream has a median density in a range from 15-40 lbs/ft$^3$, the third intermediate waste stream has a median density between 40-60 lbs/ft$^3$ and the fourth intermediate waste stream has a median density of 60 lbs/ft$^3$ or greater.

* * * * *